Jan. 13, 1931.                R. F. RUNGE                 1,788,891
           MEANS FOR SECURING ANTIFRICTION BEARINGS ON SHAFTS
                         Filed June 24, 1929
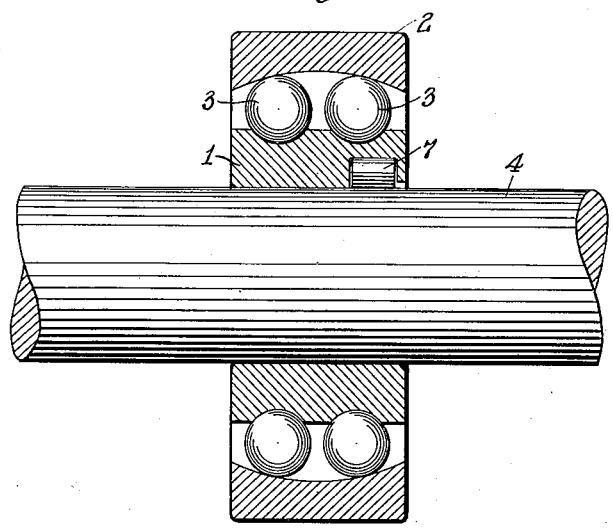
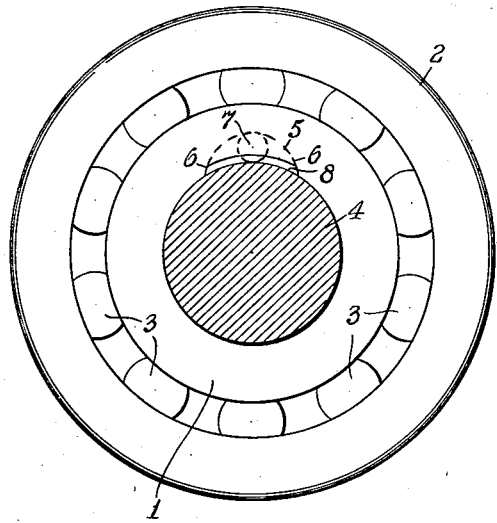  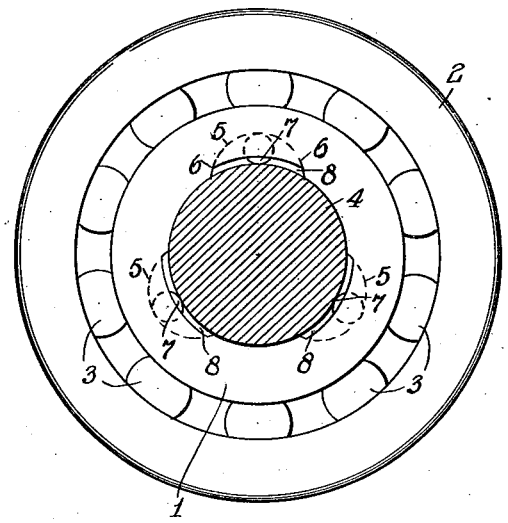
INVENTOR
ROBERT F. RUNGE
BY
     ATTORNEY Patented Jan. 13, 1931

1,788,891

UNITED STATES PATENT OFFICE

ROBERT F. RUNGE, OF FOREST HILLS GARDENS, LONG ISLAND, NEW YORK, ASSIGNOR TO THE SKAYEF BALL BEARING COMPANY, OF HARTFORD, CONNECTICUT, A CORPORATION OF CONNECTICUT

MEANS FOR SECURING ANTIFRICTION BEARINGS ON SHAFTS

Application filed June 24, 1929. Serial No. 373,119.

This invention relates to a device for securing the inner ring of substantially normal dimensions of an anti-friction bearing directly to a shaft. In the preferred form of my invention the inner ring of a ball bearing has a bore of a diameter very slightly in excess of the diameter of the shaft upon which it is to be mounted, and opening from the bore I provide one or more cam shaped pockets for carrying a rolling locking device. Preferably oppositely disposed cams are provided so that the device will securely lock itself to the shaft against a tendency for the ring to rotate in either direction.

In one embodiment of the invention three cam pockets, each having two oppositely directed cam faces, are provided located equally distant apart so that the camming action of the rollers has a tendency to center the inner ring of the bearing upon the shaft.

The accompanying drawings show the preferred manner of carying my invention into operation, wherein Figure 1 shows a bearing in longitudinal section equipped with a locking roller and mounted upon a short length of shaft.

Fig. 2 is a view taken from the right-hand end of Figure 1 showing one locking roller, and Fig. 3 is a similar view showing three locking rollers.

The antifriction bearing which has been selected for use in this illustration is a two row wide series self-aligning ball bearing having an inner ring 1, an outer ring 2 and two series of balls 3 holding these parts together. A short length of shaft 4, which may be assumed to be representative of a line shaft, is intended to be supported by the ball bearing when this is mounted in the proper hanger or pillow block.

The bore of the inner ring 1 is substantially cylindrical and is preferably of a slightly larger diameter than the diameter of the shaft 4, so that the bearing may be readily placed upon the shaft and threaded along to the position it is intended to occupy.

Heretofore it has been a great problem to securely lock the inner rings of ball bearings to line shafting in such a manner that they may be readily locked and unlocked, and in which the dimensions of the bore of the inner ring correspond approximately with the dimensions of the shaft. According to my invention one or more pockets 5 are provided in the inner ring, each of these pockets being formed with sloping side faces 6 constituting the cam faces upon which the locking roller 7 may ride when the inner race is rotated relatively to the shaft.

In Fig. 2 one such locking device is shown, in which case when the locking has been effected the bearing at the side opposite the position of the roller will be drawn tightly against the shaft.

In the form of construction shown in Fig. 3, three locking rollers are employed, these being equally distantly spaced around the shaft so that when the ring is locked to the shaft it is centered in respect to the shaft.

Sometimes, especially after the bearing has been mounted upon the shaft for a long period of time and the rotation has always been in the same direction, difficulty may be experienced in freeing the rollers from their locked position. To enable the millwright in such a contingency to mechanically move the rollers from the low part of the cam housing to the high part, spaces as 8 may be provided so that an instrument may be inserted from the outside and engage the roller and move it from its locked position.

Having described my invention, I claim and desire to secure by Letters Patent:

1. The combination with an antifriction bearing inner ring having a shaft receiving bore, of three equi-distantly spaced recesses formed in such ring and communicating with the bore, each such recess having oppositely directed cam faces, and a roller located in each recess.

2. The combination with an antifriction bearing inner ring having a shaft receiving bore, of a cam pocket formed in the ring and opening into the bore, a locking roller located in the pocket, the side of the ring adjacent the pocket being formed with an opening through which the roller may be engaged for moving it from its locked position.

Signed at New York, N. Y., this 11th day of June, 1929.

ROBERT F. RUNGE.